May 21, 1935.  C. A. WINSLOW  2,002,165
AIR CLEANER
Filed July 8, 1933
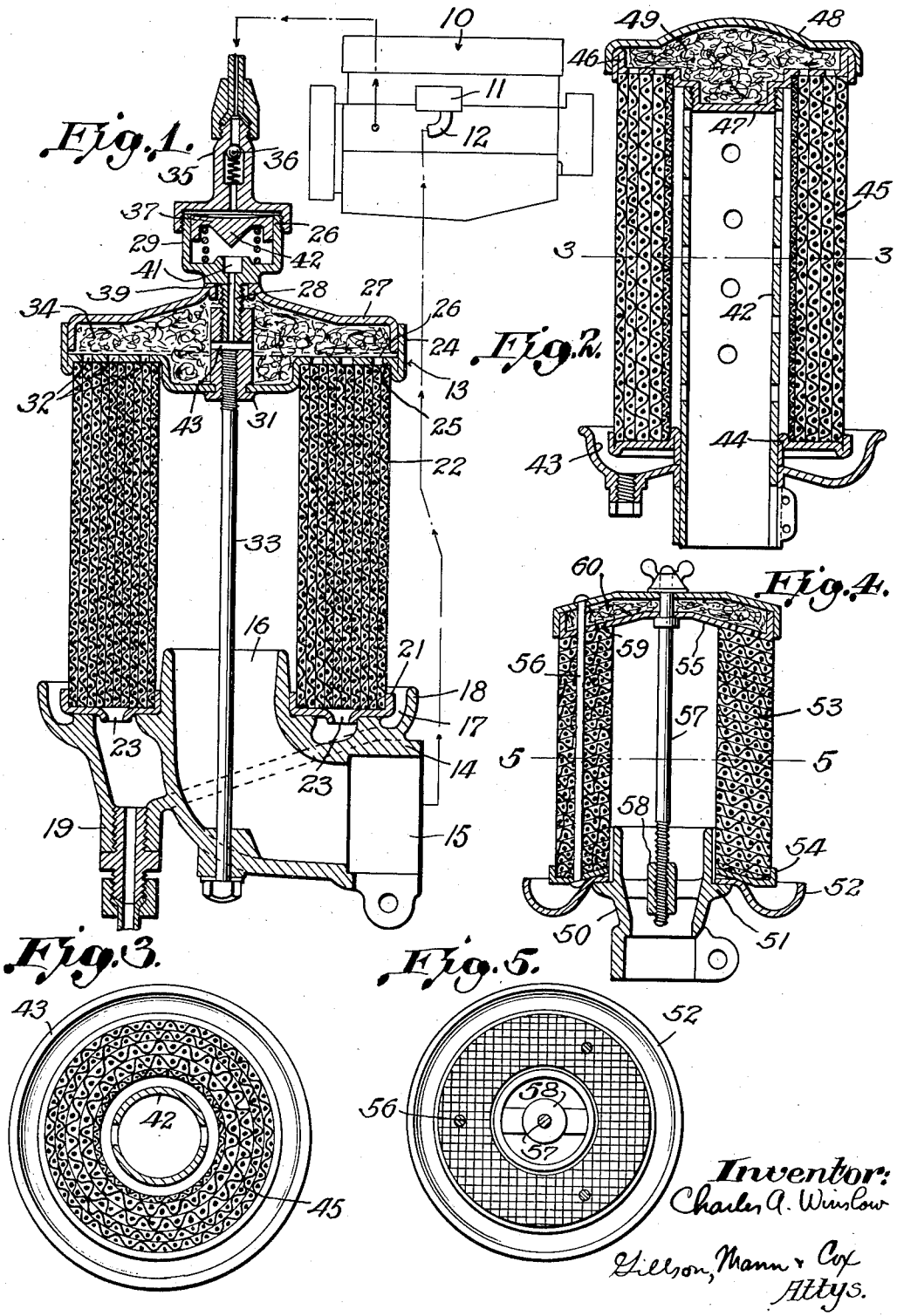
Inventor:
Charles A. Winslow
Gillson, Mann & Cox
Attys.

Patented May 21, 1935

2,002,165

UNITED STATES PATENT OFFICE 2,002,165

AIR CLEANER

Charles A. Winslow, Oakland, Calif.

Application July 8, 1933, Serial No. 679,593

12 Claims. (Cl. 123—198)

This invention relates to air cleaners for internal combustion engines and the like and, more particularly, to the type wherein the filler material is maintained in a moist condition preferably by oil from the lubricating system.

One of the objects of the invention is the provision of a new and improved filter having novel means for supplying metered quantities of oil to the filter material for maintaining the same in a moist condition without using an unnecessary excess amount of oil.

Another object of the invention is the provision of a new and improved filter having novel means for supplying oil to the filter material at intervals and for cutting off the supply of oil at other times.

A still further object of the invention is the provision of a new and improved filter in which the filter material is free and unobstructed— that is, the filter material is not enclosed in a casing, together with means for automatically oiling the filter material.

A still further object of the invention is the provision of an air filter for internal combustion engines having novel means for metering the oil supplied to the filter for wetting the filter material and which is simple in construction, economical to operate, which may be easily and readily installed, inexpensive to manufacture and which operates efficiently.

Other and further objects and advantages of the invention will appear from the following description taken in connection with the accompanying drawing, in which—

Fig. 1 is a vertical section through an air cleaner embodying the invention, appropriate connections with an internal combustion engine being diagrammatically indicated;

Fig. 2 is a vertical section of the modified form of filter construction;

Fig. 3 is a section on the line 3—3 of Fig. 2;

Fig. 4 is a vertical section of a further modified form of filter;

Fig. 5 is a section on the line 5—5 of Fig. 1.

Referring now to the drawing, the reference character 10 designates an internal combustion engine shown more or less diagrammatically, and which is provided with the usual carburetor 11 to the intake 12 of which, the filter, designated generally by the reference character 13, is attached. The engine is provided with the conventional lubricating system. Since the details of the engine constitute no part of the present invention, it is not thought necessary to further illustrate or describe the same. The filter 13 comprises a hollow base portion 14 having an outer split sleeve portion 15 which is adapted to be clamped to the intake 12 of the carburetor in the usual manner. The base is provided with a passage 16 opening upwardly through which air enters the carburetor. It is also provided with a recess 17 formed by the upwardly extending rim portion 18 extending about the outer edge of the base. The recess 17 has its bottom wall sloping downwardly to a discharge conduit 19 as shown at the left in Fig. 1. The discharge conduit may be provided with a removable plug or with a discharge cock, if desired. The recess 17 constitutes a sump for receiving the excess oil and sludge from the filter material, as will presently appear. Mounted within the sump is a channel member 21 in which is seated the lower end of the hollow filter member 22. The bottom wall of the channel member 21 is provided with openings 23 through which oil may escape into the sump. The upper end of the hollow filter member is positioned by a cap member 24 which has an annular recess 25 for receiving the upper end of the filter member. This cap member 24 has its peripheral edge turned upwardly to form a reservoir 26 having a removable closure or cover plate 27 therefor.

The closure 27 is held in position by a threaded stem 28 of an oil cup or receptacle 29 which engages an internally threaded plug 31 which, in turn, is secured to and extends upwardly from the bottom of the reservoir 26. The bottom of the reservoir is provided above the filter material 22 with a plurality of openings 32 through which oil may pass from the reservoir 26 into the upper portion of the filter member 22. The cap member 24 is held in position by a bolt 33 which extends upwardly through the bottom wall of the passage 16 and is threaded onto the plug 31, as clearly shown in Fig. 1 of the drawing.

The filter member 22 may be of any suitable construction. Preferably, though not necessarily, it is composed of laminations of wire mesh, preferably of several different mesh, in cylindrical form. The reservoir 26 is preferably filled with suitable packing or absorbent material 34, such as asbestos, mineral wool, or the like. Suitable means are provided for automatically supplying oil intermittently to the packing 34 in the reservoir 26. In the form of construction selected to illustrate one embodiment of the invention, means are provided for supplying oil in measured quantities to the reservoir 26 in sufficient amounts to properly maintain the filter member 22 in moist condition. As shown, the oil cup 29 has connected to its upper end a conduit 35 which is in communication with the force feed lubricating system of the engine 10. A check valve 36 is provided in the conduit 35 for preventing the return flow of oil in the said conduit.

Slidably mounted in the cup 29 is a plunger 37 which fits loosely therein and is normally held in elevated position by a spring 38. The threaded stem 28 is provided with a passage 39, the upper end of which constitutes a valve seat 41 adapted to receive a valve 42 on the lower side of the plunger 37 for closing said passage. A cross passage 43 in the plug 31 is in communication with the passage 39 for conducting the oil laterally into the packing 34.

When the engine is not operating, the plunger 37 is held in its upper position with the valve 42 elevated above the seat 41, as shown in Fig. 1. Upon starting the engine, the oil pump will force oil downward through the conduit 35, past the check valve 36, forcing the plunger 37 onto the seat 41 for closing the passage 39. Then, upon stopping the engine, the spring 38 will elevate the plunger 37, and, since the oil will be prevented from flowing backward through the conduit 35 by the check valve 36, the oil will flow past the plunger and then downward through the passage 39 into the reservoir 26. This will be repeated each time the engine is stopped, and, under normal operating conditions, will be sufficient to maintain the filter material properly oiled for removing dust and other foreign matter from the air without the use of an excess amount of oil. The oil will gradually flow through the openings 32 onto the upper portion of the filter material and flowing downward along this material will maintain the same in moist condition whereby dust and other foreign matter will be removed from the air passing through the filter material as it is drown through the carburetor by the suction of the engine.

When the filter element is made from woven wire laminæ, or other stiff material, the element need not be enclosed in a casing, and, consequently, the air is not restricted to an appreciable extent in its passage through the cleaner device.

In the form of the device shown in Fig. 2 there is a centrally located perforated tube 42 to which is spot-welded a sheet metal basin 43, equipped with a removable plug to permit collected oil and dirt to be drawn off. Above the basin is a ring 44 receiving the lower end of the filter 45 composed of woven wire laminæ.

A sheet metal oil chamber 46 is provided with a threaded projection 47 connected with the upper end of the tube. The removable cover 48 closes the oil chamber but permits access for replenishing the oil in the packing 49. The operation of this form is substantially the same as that shown in Fig. 1 except as to the supply of oil to the chamber.

In Fig. 4 the base of the air cleaner is a hollow casting 50 having a shoulder 51 against which rests a catch basin 52. Above the basin is a filter 53 composed of conical laminæ of woven wire, which are secured between a ring 54 and an oil chamber 55 by long rivets 56. A rod 57 swiveled in the oil chamber is threaded into a strut 58 extending across the hollow of the base casting.

In this form, the air passes inwardly through the filter and out through the hollow base. The oil in the chamber 55 seeps through the perforations 59 and passes down through the filter. The device is cleaned by unscrewing the rod 57 and dipping it in oil, which operation incidentally fills the oil chamber 55 which is filled with packing 60.

The forms of the device described and shown herein are substantially the same as that disclosed in my Patent No. 1,912,235, May 30, 1933, filed September 10, 1928.

It is thought from the foregoing taken in connection with the accompanying drawing that construction and operation of my device will be apparent to those skilled in the art and that changes in size, shape, proportion and details of construction may be made without departing from the spirit and scope of the appended claims.

I claim as my invention:

1. A filter for internal combustion engines comprising filter material, an oil reservoir above the material for oiling the same and means for intermittently supplying oil to said reservoir, and means for discharging the same therefrom onto the filter material in isolated, measured quantities.

2. A filter for internal combustion engines comprising a base member, a cap member, filter material, means for securing said material between said members, and means for automatically supplying metered isolated quantities of oil to said material.

3. A filter for internal combustion engines comprising a hollow base member, means for connecting the same to the air intake of an internal combustion engine, filter material above said base member, a cap member for engaging the upper end of said filter material, said cap member having a reservoir therein and provided with openings in its bottom wall above said material and means for metering oil and supplying the same to said reservoir for wetting said filter material.

4. In an internal combustion engine provided with a lubricating system, a base member having an air passage, a hollow filter element extending around said passage, means including pressure operated mechanism for supplying isolated, predetermined quantities of oil from the lubricating system to said element at irregular intervals.

5. A filter for internal combustion engines comprising a base, a cap, a hollow roll of woven wire of different mesh secured between said base and top and means for supplying oil to said wire upon the stopping of said engines.

6. In combination, an internal combustion engine having a carburetor and a lubrication circulating system, an air filter for cleaning the air supplied to said carburetor, said filter comprising a hollow member of reticulated material and means for withdrawing lubricating liquid from said system during the operation of the engine and supplying the same only when the engine stops to the upper portion of the reticulated material for flushing the same.

7. In combination, an internal combustion engine provided with a carburetor, a filter for cleaning the air supplied to said carburetor, said filter comprising an unconfined hollow filter element, an oil sump below said element and an oil reservoir above said element and means for discharging isolated, measured quantities of oil from said reservoir for supplying oil to said filter.

8. In an air filter for internal combustion engines, a hollow base, a hollow cylinder of filter material extending about the upper end of said base, a reservoir for containing oil, above said material, a cap for said reservoir, said material being unconfined between said base and cap, means for supplying metered quantities of oil to said reservoir during the operation of the engine for applying the same to said filter material by gravity upon the stopping of said engine, and a sump surrounding the upper portion of said base beneath said material.

9. In a filter for internal combustion engines, a filter element, means for supporting said element, an oil receptacle, for supplying oil to said filter material, means for supplying oil to said receptacle during the operation of said engine and means for discharging said oil from said receptacle only while said engine is not operating.

10. In a filter for internal combustion engines, a filter element, an oil receptacle above said element, a passage for conducting oil from said receptacle to said element, a plunger in said receptacle, a valve controlled by said plunger for closing said passage, means for conducting oil to said receptacle during the operation of said engine for filling said receptacle and for closing said valve and means for opening said valve when said engine stops, whereby the oil in said receptacle will flow onto said element.

11. In an air filter for internal combustion engines, a filter support, means for connecting said support to the intake of an internal combustion engine, a filter element carried by said support and means for automatically removing oil from said engine during its operation and for supplying the same to said element only upon the stopping of said engine.

12. In combination, an internal combustion engine having a force feed lubricating system, an air filter for said engine, said filter comprising a filter element, an oil reservoir, means controlled by the operation of the engine for conducting liquid fuel from said system to said reservoir, and means for supplying measured, isolated quantities of said oil from said reservoir to said filter.

CHARLES A. WINSLOW.